United States Patent [19]

Hinchcliffe et al.

[11] Patent Number: 4,607,477
[45] Date of Patent: Aug. 26, 1986

[54] CIGARETTE PACKING MACHINES

[75] Inventors: Dennis Hinchcliffe, London, England; Francis A. M. Labbe, Neuilly-sur-Seine, France; Desmond W. Molins, London, England

[73] Assignee: Molins PLC, London, England

[21] Appl. No.: 599,114

[22] Filed: Apr. 11, 1984

[30] Foreign Application Priority Data

Apr. 15, 1983 [GB] United Kingdom ............ 8310304
Apr. 15, 1983 [GB] United Kingdom ............ 8310305
Apr. 15, 1983 [GB] United Kingdom ............ 8310306

[51] Int. Cl.$^4$ ............................................. B65B 19/04
[52] U.S. Cl. ............................................. 53/444; 53/54; 53/137; 53/148; 53/170; 53/252
[58] Field of Search .............. 53/54, 148, 55, 151, 53/168, 170, 228, 233, 438, 444, 466, 500, 529, 579, 252

[56] References Cited

U.S. PATENT DOCUMENTS

| | | |
|---|---|---|
| 574,174 | 12/1896 | Schloss ............................ 53/233 X |
| 2,608,039 | 8/1952 | Abramowski . |
| 3,365,857 | 1/1968 | Liedtke ............................ 53/148 |
| 3,545,172 | 12/1970 | Osterdahl . |
| 3,579,952 | 5/1971 | Davies et al. . |
| 3,589,097 | 6/1971 | Gianese .......................... 53/168 X |
| 3,735,767 | 5/1973 | Kruse et al. ..................... 53/444 X |
| 3,911,643 | 10/1975 | Davies ............................. 53/170 |
| 3,924,386 | 12/1975 | Schmermund . |
| 4,079,575 | 3/1978 | Focke et al. ..................... 53/148 X |

FOREIGN PATENT DOCUMENTS

| | | |
|---|---|---|
| 2327916 | 12/1973 | Fed. Rep. of Germany ........ 53/151 |
| 2603117 | 9/1976 | Fed. Rep. of Germany ........ 53/148 |
| 1168446 | 10/1969 | United Kingdom . |
| 1166236 | 10/1969 | United Kingdom . |
| 1440929 | 6/1976 | United Kingdom . |
| 2017627 | 10/1979 | United Kingdom . |
| 1570605 | 7/1980 | United Kingdom . |
| 2098971 | 12/1982 | United Kingdom . |

Primary Examiner—John Sipos
Assistant Examiner—Steven P. Weihrouch
Attorney, Agent, or Firm—John C. Smith, Jr.

[57] ABSTRACT

A method and apparatus for packing batches of cigarettes, in which batches B are transferred from a hopper 10 into compression boxes 16 of an intermittent conveyor 14, and are then packaged (e.g. in soft packs) while passing along continuous conveyors 22, 30 and 38. Compressed batches B are transferred into U-shaped foil wrappers F1 in compartments 28 of the conveyor 22, when folding flaps 88 fold over the two sides of the wrapper before the transfer is completed (FIG. 4). In a modification, the batches are formed from a continuous stream of cigarettes (FIGS. 8 and 9), and any voids V in the stream are filled by an intermittent acceleration rotor 350 (FIG. 11).

13 Claims, 12 Drawing Figures

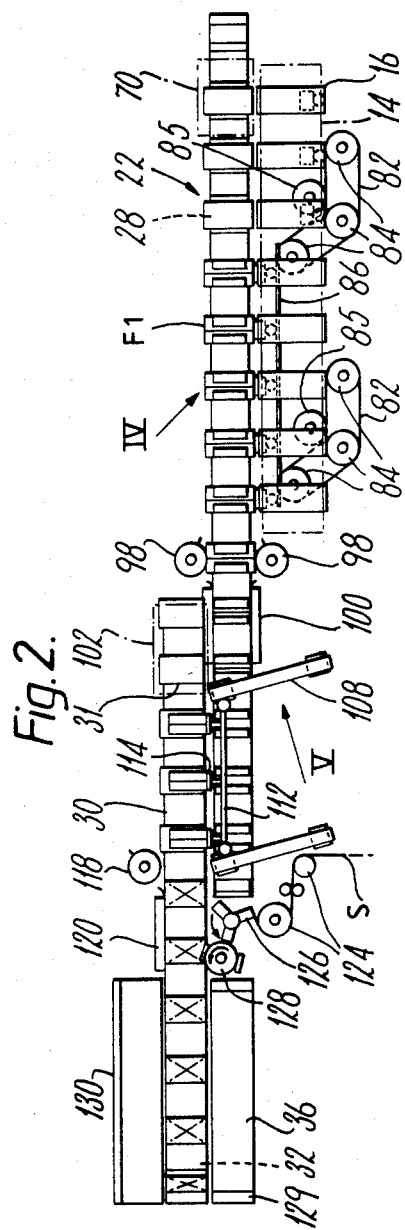
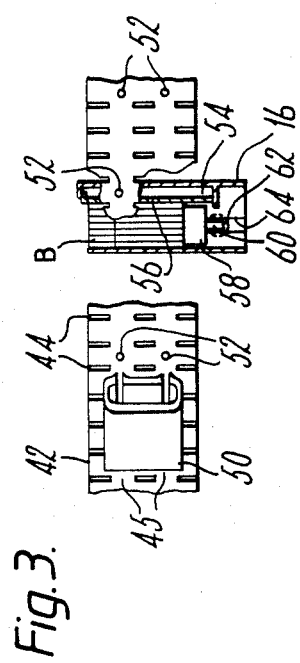
Fig. 2.
Fig. 3.

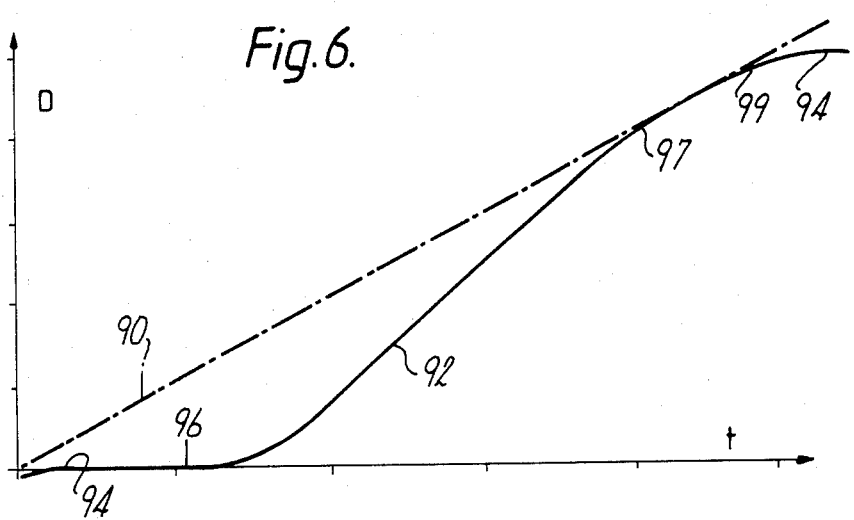
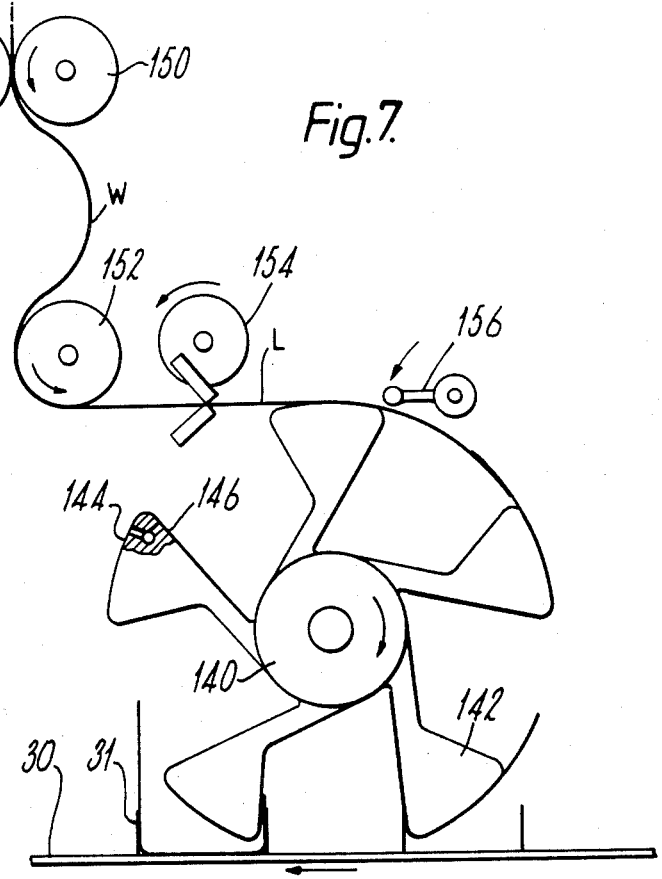

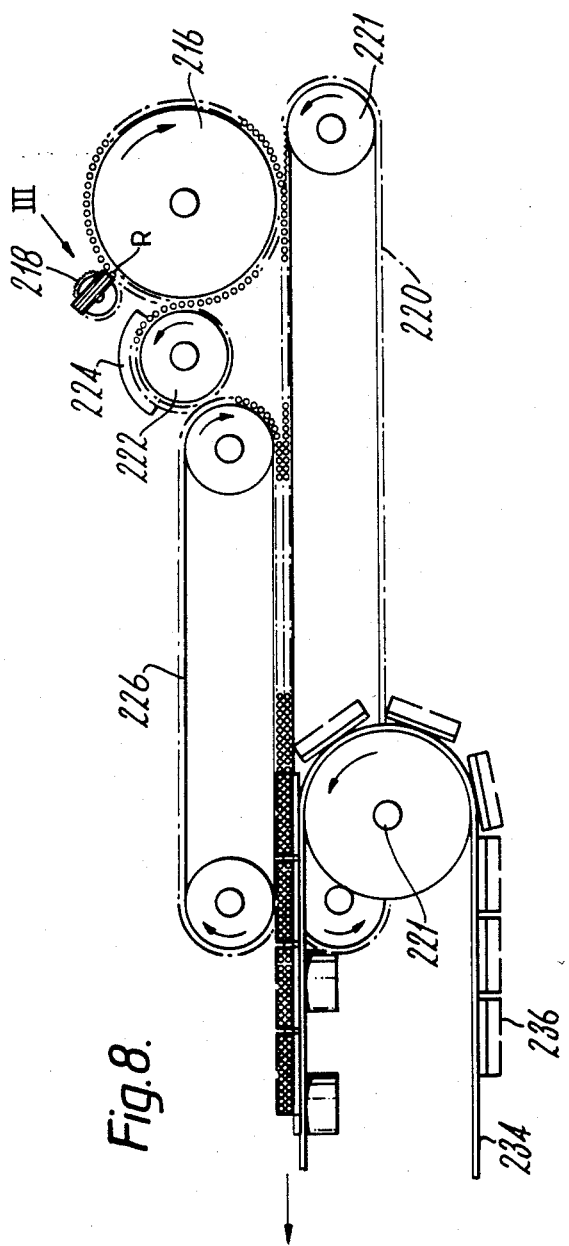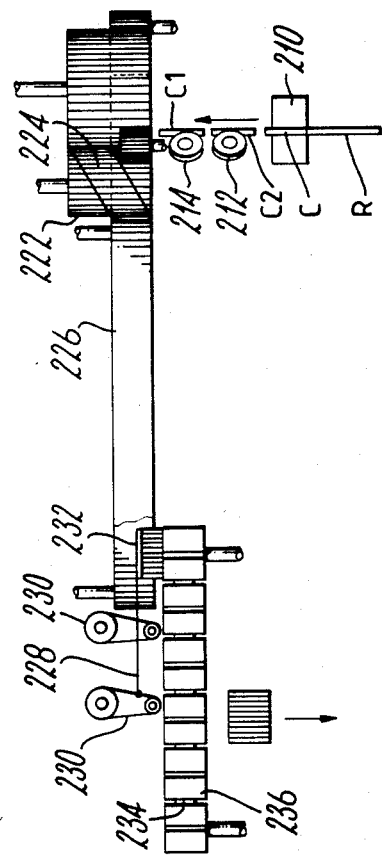
Fig.8.
Fig.9.

CIGARETTE PACKING MACHINES

Machines for packing cigarettes are at present generally of the type which operate at high-speed intermittent cycles, whether the packets are, for example, of the hinged lid or soft pack style. Inevitably, therefore, such packing machines come up against a speed threshold above which it becomes increasingly difficult to achieve higher outputs. It has been recognised that to overcome this problem it is necessary for the packing materials and cigarettes to be fed in a continuous manner. Proposals have been made for continuous packing machines of cigarettes, for example in U.S. Pat. Nos. 3,545,172 and 3,579,952 and British Pat. No. 2017627; but for various reasons none of these proposals has been found acceptable.

According to one aspect of the present invention there is provided apparatus for wrapping batches of cigarettes, comprising a wrapper conveyor provided with a plurality of regularly-spaced U-shaped compartments each having a pair of sides which lie transverse to the direction of movement of the conveyor, wrapper feed means for feeding a wrapper in a U-shape into each compartment, a batch conveyor adjacent the wrapper conveyor and provided with a plurality of correspondingly spaced pockets each for carrying a batch of cigarettes and movable with a respective compartment, transfer means operable to transfer a batch from each pocket into a wrapper in a respective compartment, and means for folding the two sides of each wrapper over the respective batch during such transfer.

Other aspects and features of the invention are defined in the appended claims.

The invention will now be described by way of example with reference to the accompanying drawings, in which:

FIG. 2 is a plan view of the machine taken on the line II—II in FIG. 1,

Figure 1:
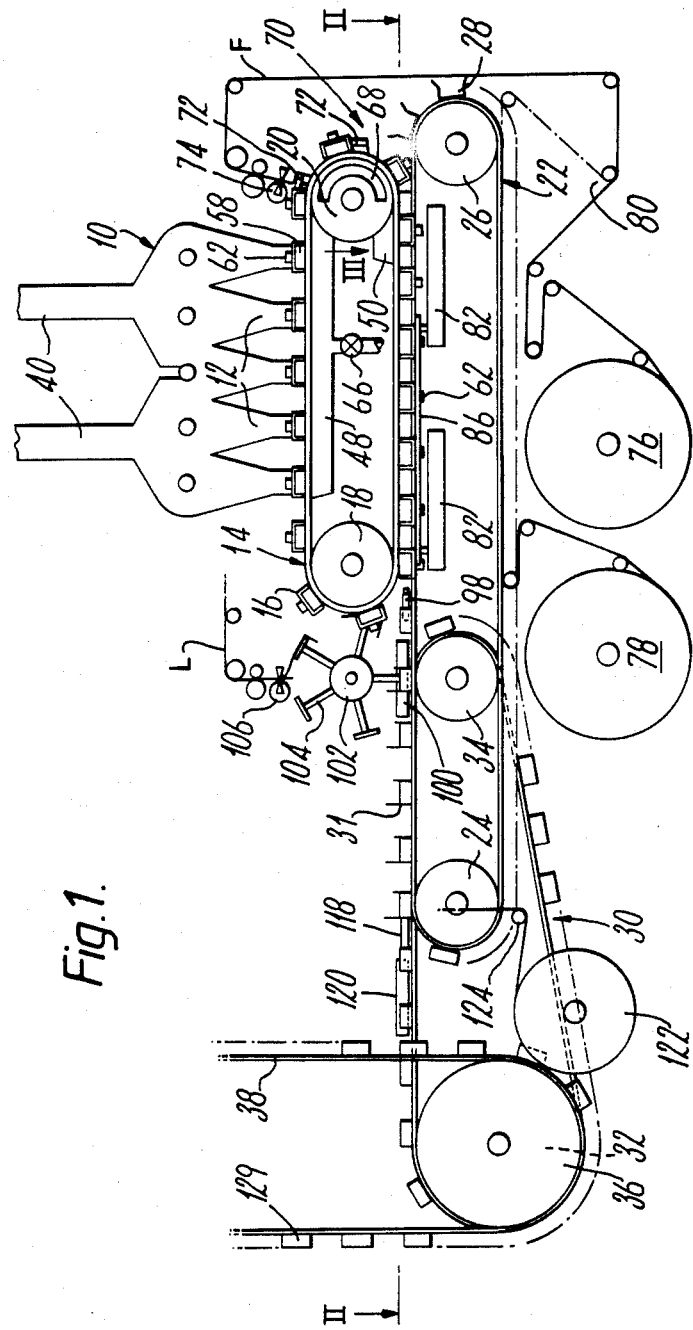
FIG. 1 is an elevational view of a cigarette packing machine in accordance with the invention.
Figure 4:
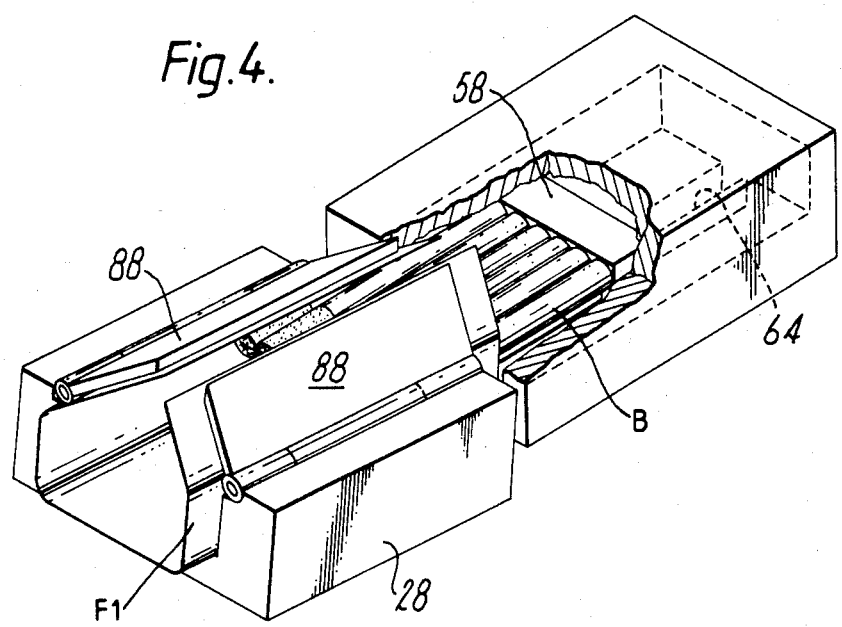
Figure 5:
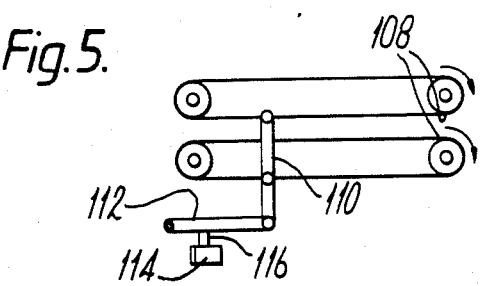
Figure 10:
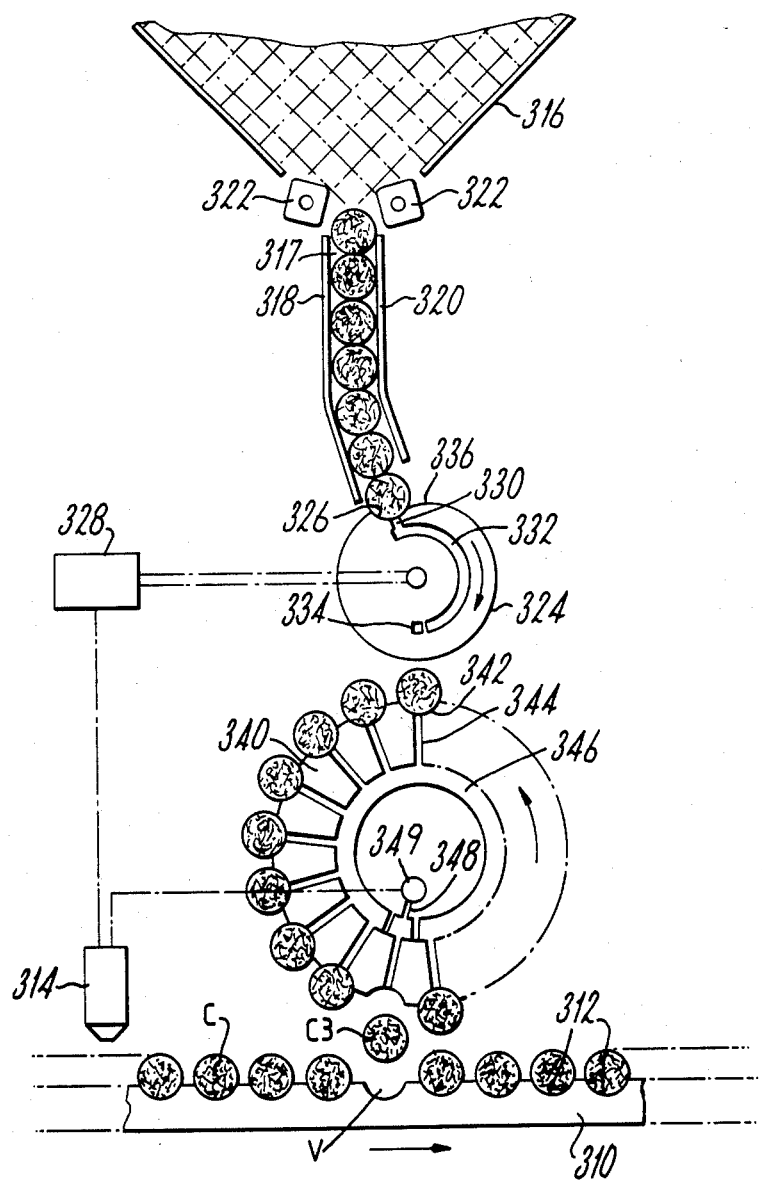
Figure 11:
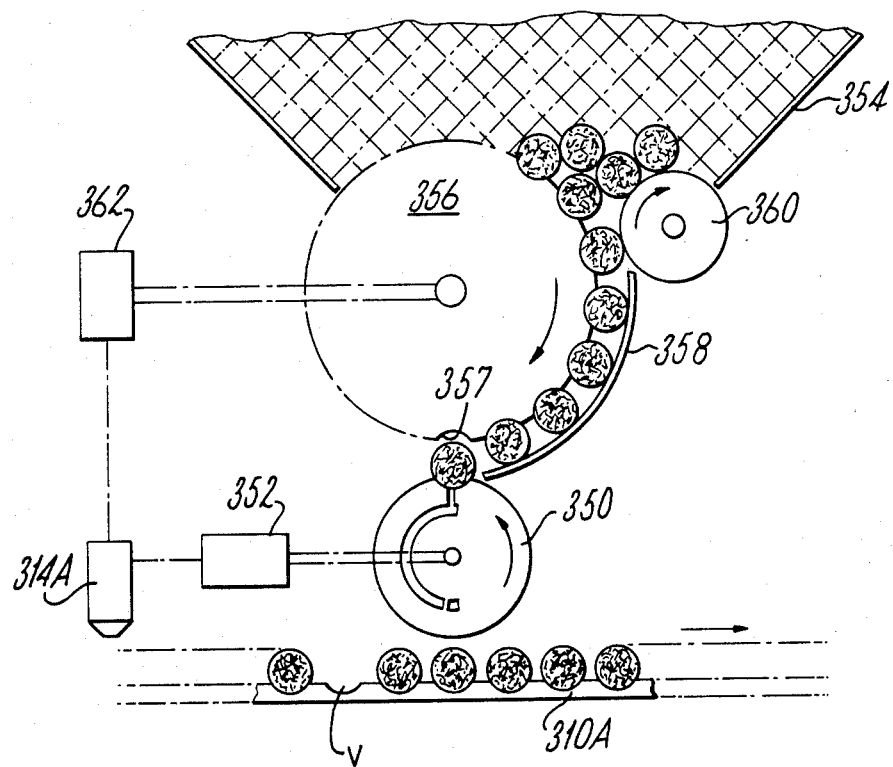
Figure 12:
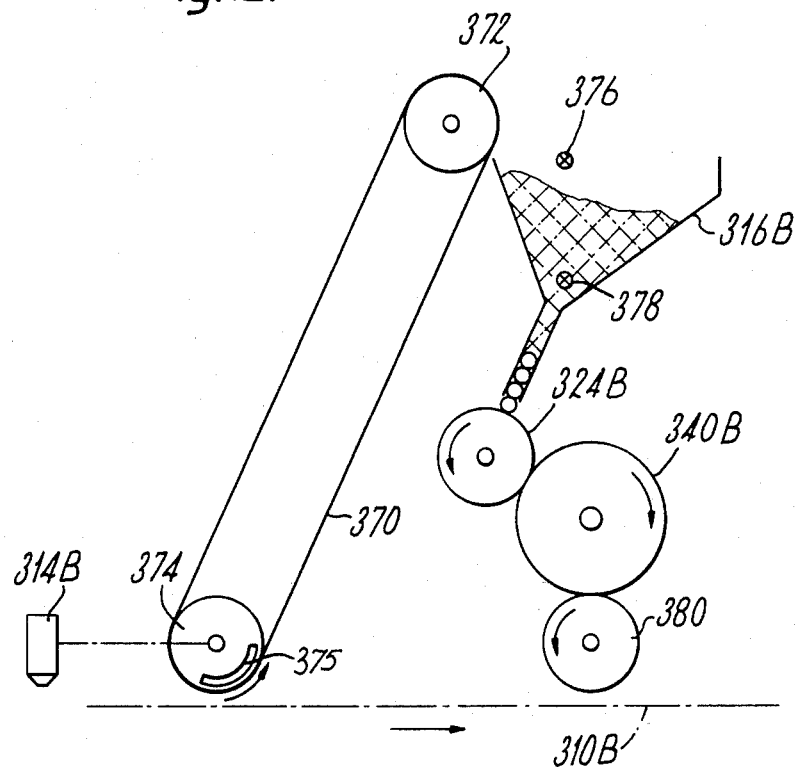

FIG. 3 is an enlarged plan view, partly in section, taken in the direction of arrow III in FIG. 1, FIG. 4 is an enlarged perspective view of a batch transfer taken in the direction of arrow IV in FIG. 2, FIG. 5 is a side view of a diagonal conveyor of FIG. 2 taken in the direction of arrow V thereof, FIG. 6 is a displacement/time diagram of two of the conveyors of the machine, FIG. 7 is a modification of the label feed mechanism shown in FIG. 1, FIG. 8 is an elevational view of a modified batching arrangement for feeding the machine of FIGS. 1 and 2, FIG. 9 is a plan view of the arrangement of FIG. 8 drawn to a smaller scale, FIG. 10 is a side view of a device for filling voids in a continuous cigarette stream before they are batched by an arrangement as shown in FIGS. 8 and 9, FIG. 11 is a modification of the device of FIG. 10, and FIG. 12 is a further modification of the device of FIG. 10 but drawn to a smaller scale.

The main parts of the packing machine are shown in FIGS. 1 and 2, and will first be described in outline.

A cigarette hopper is shown generally at 10 and has five outlets 12. In front of the outlets 12 is a batch conveyor 14 which is driven intermittently, and which carries a series of compression pockets 16 whose pitch corresponds with that between the outlets of the cigarette hopper 10.

The conveyor 14 is trained about pulleys 18 and 20 and its lower run is level with the upper run of a wrapper or filler conveyor 22, which is trained about pulleys 24 and 26. The conveyor 22 carries a succession of compartments 28 which are spaced apart by the same pitch as the compression pockets 16.

Behind the conveyor 22 is a packing conveyor 30 also carrying compartments or cells 31 and trained about a large downstream pulley 32 and a smaller upstream pulley 34. Concentric with the pulley 32 is a further pulley 36 around which is trained a drying conveyor 38 which extends in a vertical direction and whose upper pulley is not shown.

Further details of the machine will now be described with additional reference to FIGS. 3 and 4.

Cigarettes are fed to the hopper 10 through the two inlets 40. When the intermittent batch conveyor 14 is at rest a batch of cigarettes is ejected from each outlet 12 into an aligned compression pocket 16 of the conveyor 14.

As can be seen from FIG. 3 the batch conveyor itself is made of a belt 42 formed with internal teeth 44, which are engageable between corresponding teeth (not shown) formed on pulleys 18 and 20. The teeth are intersected by a pair of longitudinal grooves 45 so that each tooth 44 is in three parts; and upper and lower air pressure ducts 48 and 50 respectively are in contact with the grooves.

At each position where a compression pocket 16 is mounted on the belt 42 there are a pair of apertures 52 passing through the belt and into a pressure chamber 54 in the compression pocket. The chamber 54 has an inner wall 56 which is slidable laterally against the side of a batch of cigarettes B to compress the batch when air under pressure is supplied by the ducts 48, and 50. Also formed in the compression pocket is a pusher 58 which is engagable with the end of the bundle B that has the tobacco ends of the cigarettes. The pusher 58 is connected by a support slide 60 to a roller 62 which actuates the pusher. A slot 64 in the compression pocket allows the support slide to move longitudinally through the pocket 16.

The lower pressure duct 50 is permanently connected to a source of air pressure, whereas the upper duct 48 is connected by a valve 66 to the source of air pressure so that the pressure in the duct 48 can selectively be applied. While the belt 42 is passing around the pulley 20 air pressure to the chambers 54 of the compression pockets is maintained through the apertures 52 by air pressure connected through an arcuate port 68 through bores in the teeth (not shown) of the pulley 20.

Behind the pulley 20 is a foil rotor 70 having five arms 72 (only two of which can be seen in FIG. 1), each arm having at its end a peripheral suction surface which is of a size suited to fit into the internal base of a compartment 28 in the filler conveyor 22. Foil wrapping material F is fed to the rotor 70 past a rotary cutter 74 from a foil reel 76. To the left of the foil reel 76 is a spare reel 78 which can be spliced at a position 80 to the foil material F when the reel 76 is exhausted.

Under the batch conveyor 14 are a pair of diagonal transfer belts 82 each extending around three pulleys 84 and about a tensioning pulley 85 to form a shape generally of the letter L, as seen in FIG. 2. Connected between the belts 82 is a bar 86 which in operation is engagable with the pusher rollers 62 of five adjacent compression pockets 16.

One of the compartments 28 is shown in FIG. 4 in a position in which a bundle of cigarettes has been partly transferred into the compartment. A piece of cut foil F1 is held in the compartment by suction against the sides and base of the compartment. Above each side wall is a hinged flap 88 which is spring biassed by a toggle mechanism (not shown) to be movable either into an upright or a horizontal position.

When five compartments 28 are in the transfer position shown in FIG. 4, each to receive a bundle of cigarettes, the compartments are tilted downwardly at their entrance end by an angle of about 5° on the filler conveyor 22, which is equivalent to an angle of about 175° with respect to the compression pockets 16 on the batch conveyor 14.

The operation of the machine so far described will now be explained with reference additionally to FIG. 6, which is a diagram showing the displacement D against time t of the intermittent batch conveyor 14. The straight chain-dotted line 90 in FIG. 6 represents the constant speed of the filler conveyor 22, while the curved line 92 represents the corresponding intermittent speed of the batch conveyor 14 over one cycle.

Commencing at point 94, the batch conveyor has just come to rest so that five of the compression pockets 16 are aligned with the outlets 12 of the cigarette hopper. A batch of cigarettes is then transferred from each outlet to fill a respective compression pocket, and at point 96 the batch conveyor commences to accelerate up to a speed which is higher than the constant speed of the filler conveyer 22. The five batches in the pockets 16 downstream of these pockets which have just been filled during this time maintained under compression. Meanwhile the five further downstream pockets 16, ahead of the latter pockets under compression, have passed beyond the air pressure duct 50 so that compression of their bundles is released, in readiness for their transfer to the conveyor 22. At point 97 the conveyor 14 has caught up with, and is again in phase with, the conveyor 22 after its stationary period, so that its speed is the same as that of the conveyor 22.

At this time the bar 86 between the transfer belts 82 comes into engagement with the rollers 62 of the five pockets 16 whose batches are about to be transferred. As the bar 86 passes around the outer pulley 85 it gradually accelerates the rollers 62, and hence the pushers 58 in the compression pockets, so as to commence transfer of the bundles towards the filler conveyor 22. As can be seen in FIG. 4 the compartments are now tilted downwards so that the bottom edge of each foil wrapper F1, which was folded by the rotor 70 into a U-shape in each compartment 28, will clear the lower edges of the cigarette batch B.

When the leading end of the batch is about half way into its respective compartment 28, the hinged flaps 88 are deflected by actuators (not shown) to their horizontal biassed closed position so as to fold the upstanding foil downwards onto the batch, one of the flaps 88 being slightly ahead of the other so that the edges of the foil overlap one another. The transfer of the batch is then completed with the foil now formed into a tubular shape around the batch. At the end of the transfer the pusher 58 is retracted by a spring (not shown), and as soon as it has cleared the protruding end of the tubular shaped foil, the drive to the batch conveyor 14 decelerates it, as shown at 99, FIG. 6, to bring the conveyor to rest again at 94 for the next batch to be loaded from the hopper 10.

As each filled compartment 28 moves onwards along the filler conveyor 22, it passes a pair of tucking rotary folders 98 to form a tuck at the trailing rear edge of each side of the tubular foil wrapper F1. A pair of plough folders 100 next forms the leading tucks and also folds down the upper and lower foil flaps at each side to complete the end folds of the foil wrapper.

Above the pulley 34 of the packing conveyor 30 is a label rotor 102 similar to the foil rotor 70, and having likewise five arms 104 with suction applied to the outer periphery of each arm. A continuous web of labels L is fed down towards the rotor 102 and past a rotary cutter 106 which severs the label, in registration between printed matter thereon, the rotor 102 being timed in phase with the feed of the labels and with the passage of the cells 31 of the packing conveyor 30. The linear speed of feed of the labels L is higher than the rotary speed of the arms 104 so that the leading end of each label moves radially in between adjacent arms 104 and is then folded as the respective arm passes the label. The labels are then formed in the cells into a U-shape, in the same way as with the foil rotor 70 previously described.

Referring now also to FIG. 5, downstream of the plough folders 100 are two pairs of diagonally mounted conveyor belts 108, a vertical bar 110 being connected between the upper and lower belts of each pair. Extending between the pairs of bars 110 is a transverse rod 112 on which are mounted three pushers 114. The belts 108 are driven at a speed such that the pushers 114 are successively brought into contact with the foil wrapped batches in three successive compartments 28 at a time. The pushers 114 are mounted on the rod 112 by narrow supports 116 which pass through the gaps between the flaps 88 of the compartments 28.

Each cell 31 of the packing conveyor 30 has a pair of flaps (not shown), similar to the flaps 88, for folding over the upstanding ends of labels. When a foil wrapped batch has been transferred into each U-shaped label, its ends are then likewise folded into a tube.

The formed packets now pass a rotary folder 118 which forms a trailing tuck at the bottom end of the packet. The leading tuck and the upper and lower folds are then made by a plough folder 120, similar to the plough folder 100 for the foil wrapper.

Downstream of the plough folder 120 is a device for applying stamps S to the top ends of the packets. Stamps are fed from a stamp reel 122 (FIG. 1) via pulleys 124 towards a three-armed rotor 126 (FIG. 2). The stamps are cut (by means not shown) and received on the arms of the rotor 126 which apply them to successive top ends of the packets. The ends of the stamps are then folded around the top ends of the packets by a flanged roller 128.

The packets are now complete and pass around the pulley 32 of the packet conveyor 30, being held against the conveyor by a top belt (not shown). When the cells 31 come into alignment with pockets 129 on the drying conveyor 38 the packets are plunged forwardly (i.e. with their stamps leading) by a device 130 behind the pulley 32. During their travel on the drying conveyor the adhesive on the stamps and on the labels L is dried.

FIG. 7 shows a modification of the label feed mechanism, which could also be adapted to replace the foil rotor 70 and its feed mechanism.

A label rotor 140, similar to the rotor 102 described, has five arms 142 each having a peripheral suction surface 144. The rotor is driven clockwise at constant speed, so that each arm engages or meshes with a cell 31 of the packing conveyor 30. The leading face 146 of each arm is at an acute angle to the surface 144 and is also provided with a suction surface.

The web of labels L is fed downwards at a constant speed by a pair of pull rollers 148, 150 and then passes onto a suction feed roller 152 driven at a cyclic speed. A rotary cutter 154 is positioned between the suction roller 152 and the rotor 140. Downstream of the cutter 154 is a rotary folder 156 rotatable anticlockwise in time with the passge of each arm 142.

In operation, the web label is drawn at a constant rate by the pull rollers 148, 150 and fed towards the suction roller 152 for onward feeding between guides (not shown) to an arm 142 of the rotor 140. At the instant shown the cutter 154 is severing the web to cut off a label L now held by suction on the arm 142. At this time the feed roller 152 is rotating at minimum speed so that a small loop of web W is formed upstream of it.

The leading portion of the label on arm 142 now starts to be folded inwards by the folder 156, which progressively smooths it against the leading suction surface 146 of the rotor 140. The arm then deposits the label L into a cell 31 while its trailing portion is folded by the rear side wall of the cell. In order to accomodate for small speed differences between the conveyor 30 and the peripheral speed of the rotor 140, each arm 142 is resiliently formed on the rotor so that the arm is bent back slightly as it engages against the front side wall of a cell.

In a further modification the hopper and batching section of the packing machine described may be modified to pack batches which are directly formed from a continuous stream of cigarettes. Such a modification is shown in FIGS. 8 to 10.

Referring first to FIGS. 8 and 9, there is shown a continuous cigarette rod R being severed into lengths by a cut-off device 210. The resulting plain cigarettes then proceed to a first shifting disc 212 formed with a helical groove around 180° of its circumference. The remaining 180° of the disc is relieved so that it does not contact the cigarettes. Downstream of the disc 212 is a second shifting disc 214 having a single turn helical groove around its circumference, i.e. a 360° groove of the same helix angle as that of the disc 212.

The planes of rotation of the discs 212 and 214 are each inclined relative to the rod line R by an angle of about 3° which corresponds to the helix angle of the grooves. Thus at any instant the lowermost portion of the grooves which contact the cigarettes are parallel to the rod line.

The discs 212 and 214 are inclined at an angle of 45° (in addition to the 3° inclination previously mentioned). The spacing between the discs 212 and 214 is slightly greater than the length of a cigarette, while the circumference of each disc is slightly greater than twice the length of a cigarette.

Beyond the disc 214 is a catcher drum 216 formed with flutes. The catcher drum 216 is formed with double cigarette length flutes, and has a cooperating smaller drum 218, formed with corresponding length flutes, disposed at the opposite side of the rod line. The catcher drum is arranged to recieve cigarettes at a position just under 45° from its top centre.

The manner in which the cigarettes are fed into the catcher drum will now be described. The cut-off 210 severs the cigarette rod to form a succession of closely spaced pairs of cigarettes C. As the first cigarette C1 of a pair reaches the disc 212 it misses the 180° groove and so passes onwards to the disc 214. The peripheral speed of the discs is greater than the rod speed, so that when the leading end of the cigarette C1 is engaged by the first half of the disc 214 it accelerates the cigarette C1 away from the succeeding cigarette C2 to form a small gap between. In passing under the disc 214 the cigarette C1 is also moved laterally in the direction of the movement of the catcher drum 216. The rotational timing between the disc 214 and the flutes of the catcher drum is so arranged that as the leading end of cigarette C1 reaches the catcher drum it is aligned with, and moving substantially at the same speed as, a flute in the drum.

The second cigarette C2 of the pair now comes under the influence of disc 212, which similarly accelerates it away from the next cigarette and commences to move it laterally also in the direction of the catcher drum. The grooves in the discs 212 and 214 are so arranged that as the leading end of cigarette C1 reaches the disc 214 it is aligned with the second half of its groove, so that it continues to be moved laterally by the disc 214. In this manner the cigarette C2 follows the first cigarette C1 substantially in alignment, so that it too enters the same flute as the cigarette C1. The next pair of cigarettes similarly follow into the succeeding flute of the drum.

In a modification (not shown) of this part of the apparatus described, the cigarette making machine produces double length cigarettes which are fed by a single shifting disc into a similar catcher drum. An annular groove extends through the middle of the suction flutes of the catcher drum in which operates a cutting disc for severing the double length cigarettes into pairs of single length.

Referring again to FIGS. 8 and 9, a horizontal conveyor 220 mounted on pulleys 221 is provided under the catcher drum 216, and its upper operating run is supported on a horizontal guide (not shown). The width of the conveyor 220 is half that of the catcher drum (see FIG. 8) and it has grooves formed on it to hold the cigarettes with their major axes at an angle of about 30° to the horizontal.

To the left of the catcher drum 216, as viewed in FIG. 8, there is a transfer drum 222 of the same width as the catcher drum. The drum 222 has suction flutes corresponding to the catcher drum 216, i.e. similar to the drum 218, and has a transfer drum 224 for transferring cigarettes from its rear half, as considered with respect of FIG. 8, to its front half. To the left of the transfer drum is a further conveyor 226 communicating with the transfer drum and running parallel to the conveyor 220.

The operation of the latter part of the apparatus just described is as follows. The pairs of cigarettes held on the catcher drum 216 form front and rear rows, as considered with respect to FIG. 8. When the front row reaches the conveyor 220, suction is released from the flutes of the catcher drum and the row of cigarettes is deposited into its grooves. The cigarettes in the rear row continue around the catcher drum up to the 9 o'clock position where they are transferred to the transfer drum 222. On reaching the transfer drum 224, which may be of a known mechanical or a pneumatic device, the cigarettes are transferred from the rear to the front half thereof so that when they reach the conveyor 226 they are vertically above the first front row. The conveyor 226 also has suction grooves to hold the second row of cigarettes; and the second row is thus conveyed into contact with the top of the first row of cigarettes, the timing between the conveyors 226 and 221 being such that in the resulting two superposed continuous rows there is an upper cigarette resting vertically above each lower cigarette.

At the end of the conveyor 226 is a grouping arrangement including a pusher support 228 mounted on two timing belts 230, whose operating runs are inclined forwardly with respect to the movement of the conveyors 226 and 220. A pusher 232 extends from the pusher support 228 and is shaped to engage the ends of a group of cigarettes from the 2 rows and to pass between the conveyors 220 and 226. The timing belts 230 carry the pusher in an orbitable path, the active part of which is at such an angle that the pusher moves at the same speed as the conveyors 220 and 226 while passing transversely between them. Opposite the conveyors 220 and 226 is a conveyor 234 formed with closely spaced compartments 236 each adapted to receive a group of twenty cigarettes in two rows.

The conveyor 234 may be adapted to take the place of the batch conveyor 14 described above. Such batches could then be transferred by a pusher into each compartment 28 (FIG. 4). In this manner the present hopper 10 would be omitted so that there would be a direct link between the cigarette making machine and the packing machine: this has the advantage of enabling the entire process of making and packing to be a continuous non-intermittent operation.

If with such a linked system it is required to incorporate an inspection device for checking and rejecting faulty cigarettes from the continuous stream before they are directly formed into batches (either by the apparatus of FIGS. 8 and 9, or for example by apparatus as disclosed in British Pat. No. 2098971), then the resulting voids in the cigarette stream may be filled by a device as shown in FIGS. 10 to 12.

Referring first to FIG. 10 there is shown a conveyor band 310 formed with transverse suction flutes 312 to convey a succession or stream of cigarettes C from a cigarette inspection device (not shown) where occasional cigarettes are rejected, thus forming voids V in the stream. Such voids in the stream are detected by a detector 314, which may form part of the inspection device.

Disposed above the conveyor band 310 is a cigarette hopper 316 containing a supply of cigarettes to replace the voids V in the cigarette stream. The hopper extends into a vertical channel 317 of a width slightly greater than the diameter of a cigarette, and formed by left and right walls 318 and 320 respectively. Between the vanes of the channel 317 and the hopper itself are a pair of rollers 322 which serve to agitate the cigarettes to feed them into the channel. Below the exit to the channel, and slightly offset to the left, is an acceleration drum 324 formed with a single transverse flute 326. The drum 324 is driven by a stepper motor 328 to selectively rotate the drum 324 clockwise through one revolution.

The flute 326 includes a row of suction apertures 330 connected through an arcuate suction port 332 to a source of suction. The suction port 332 ends just before the 6 o'clock position of the drum, and immediately downstream of it is a small air pressure port 334.

The periphery of the drum 324 immediately downstream of the flute 326 is relieved slightly, as shown at 336, in order to provide a gradual lead-in for a cigarette entering from the bottom of the channel 317 into the flute.

Positioned between the conveyor band 310 and the drum 326 is a reservoir drum 340 having some eighteen transverse flutes 342 formed on its periphery, each for holding a cigarette. Each flute is provided with a set of suction apertures 344, similar to the apertures 330 in the drum 324. The apertures are connected with an arcuate suction port 346 which extends through practically 360°, except just upstream of the 6 o'clock position where there is an air pressure port 348.

Normally the port 348 is in communication with suction, just as the arcuate port 346 but the suction to the expulsion port 348 can be reversed to provide an air pressure jet by switching a valve 349 controlled by a memory device (not shown) connected to the detector 314.

The drum 340 is rotatable continuously at a peripheral speed corresponding precisely to the speed at which the conveyor band 310 is moving.

The operation of the device described is as follows:

When the detector 314 senses a void V in the cigarette stream, it stores a signal in a known memory device (not shown) until the void is almost at its closest point beneath the rotor 340. At this instant the valve 349 for the port 348 is momentarily switched over to air pressure so that a cigarette C3 on the drum 340 is expelled from its flute 342 and travels a short distance downwards to fill the void V in the suction flute 312 of the conveyor 310. The valve 349 is then immediately switched back to suction for the port 348 so that subsequent cigarettes on the drum 340 are held at the 6 o'clock position.

As the now empty flute in the drum 340 rotates towards the drum 324 a delayed signal is applied to the stepper motor 328 to accelerate the drum 324 up to the speed of the drum 340, so that a cigarette held in the flute 326 is fed in timed relationship into the empty flute in the drum 340. The drum 324 then decelerates, and the flute 326 normally comes to rest under the channel 317, unless a further cigarette has to be fed to the drum 340. In this way the drum 340 is replenished as rapidly as possible after the filling of any voids.

It will be noted that the bottom of the channel 317 is slightly curved to the right, and that the wall 318 extends down further towards the drum 324 than the right-hand wall 320, which must provide clearance for a cigarette to move under it. This curved offsetting of the channel 317 has a dual function: first to allow a slightly larger angle for the drum 324 to accelerate a cigarette up to the maximum speed for transfer of the cigarette to the drum 340 (the remaining complementary angle being sufficient for the empty drum 324 to decelerate to rest); and secondly to reduce the likelihood of damage to the next lowermost cigarette in the channel 317, which will be rolling on the periphery of the drum 324 after the drum has started accelerating away from the channel with the previous cigarette held in the flute 326.

A modification of the device described is shown in FIG. 11. As in FIG. 10, a conveyor band 10A conveys a succession of cigarettes having voids V, which are detected by a detector 314A. Immediately above the cigarette stream, but spaced closer than the drum 340 of FIG. 10, is an acceleration drum 350 similar to the drum 324 except that it is rotatable anti-clockwise by a stepping motor 352.

The feed of individual cigarettes to the drum 350 may be from a hopper, as previously described. As an alternative there is shown a large hopper 354 at the bottom of which is an indexible drum 356 having a series of transverse flutes 357 each to accept a cigarette.

The cigarettes are held in the flutes by suction, and additionally a cover 358 is provided outside the path of the cigarettes from the hopper 354. At the entrance to the path is a refuser roller 360 to ensure that each flute 357 is filled. The drum 356 is indexed clockwise by a stepper motor 362.

In operation, the detector 314A senses a void V and at the correct instant (e.g. at the position as shown) the stepper motor 352 is actuated to accelerate a cigarette from the drum 350 practically into the void V. The drum 350 is then decelerated to bring its flute back up to the top. The stepper motor 362 now indexes the drum 356 one pitch to bring the next cigarette into position for the drum 350 to receive that cigarette.

It will be apparent that the modified apparatus is simpler than the apparatus shown in FIG. 10, and it has the advantage that the cigarette is placed almost directly into the void V, instead of being dropped a small distance as in FIG. 10. However, though the drum 350 need not come to a complete stop when picking up further cigarettes to replenish a subsequent void, it is not capable of filling two successive voids in the conveyor 310. In contrast, the apparatus of FIG. 1 allows a succession of up to eighteen voids to be filled by the reservoir drum 340, which can then be replenished fairly rapidly by the drum 324 supplying a cigarette at each rotation (or less) of the drum 340.

FIG. 12 shows a further modification of the device of FIG. 10 drawn to a smaller scale, and illustrates how the cigarette hopper can be kept filled.

A conveyor band 310B again conveys a stream of cigarettes (not shown) past a detector 314B which detects any voids in the stream. Downstream of the detector is an elevating conveyor belt 370 formed with transverse suction flutes, similar to the flutes 312. The belt 370 is trained about an upper pulley 372 and a lower pulley 374, which drive the belt continuously counter-clockwise at the same speed as the band 310B. The pulley 374 is positioned close to the band 310B, and suction is applied to the belt 370 from a port 375 adjacent to the pulley 374 and also along the operating run of the belt towards the pulley 372, so that selected cigarettes can be transferred from the band 310B on to the belt 370 in response to detection by the detector 314.

Adjacent to the upper pulley 372 at the end of the operating run of the belt 370 is a cigarette hopper 316B, which is kept filled by the selected cigarettes raised by the belt 370. The level in the hopper is maintained between upper and lower limits by level sensors 376 and 378 respectively.

Under the channel outlet of the hopper 316B is an acceleration drum 324B which keeps a reservoir drum 340B replenished, in the same manner as described with reference to FIG. 10. Interposed between the conveyor belt 310B and the drum 340B is a small transfer drum 380, which is similar to the drum 324B; but the drum 380 rotates continuously just clear of the cigarette stream and has several shallow suction flutes (not shown) formed on it, which are normally empty of cigarettes. Downstream of the drum 380 is a batching apparatus (e.g. as disclosed in the aforementioned G.B. Specification No. 2098971) for forming the cigarettes into groups of twenty cigarettes in each group.

In operation, if the level in the hopper 316B lies between the sensors 376 and 378 the belt 370 will be running empty. When the detector 314B signals that there is a void in the cigarette stream on the band 310B, a cigarette is transferred at the correct instant from the reservoir drum 340B to the transfer drum 380, and from thence is transferred almost directly into the void, i.e. with only a small drop occurring.

When the level in the hopper falls below the lower sensor 378 and the detector 314B senses a void, its memory device causes suction to be applied to the port 375 during the precise period during which a particular succession of cigarettes containing the void (which would otherwise subsequently be formed into a group in the batching apparatus) is passing under the pulley 374. Thus the whole group containing the void is transferred to the belt 370 and filled into the hopper.

A series of, say, twenty voids (in the case of groups of twenty cigarettes) thus pass under the drum 380 without, of course, the voids being refilled. And in the subsequent packaging of the groups in the packing machine the wrapping materials for that missing group are withheld or inhibited, so that no materials are wasted.

Instead of having level sensors in the hopper 316B it can be arranged to have an electronic up-and-down counter. In operation such a counter would count the number of cigarettes which had been fed into voids, and substract that number from a predetermined number corresponding approximately to the number of cigarettes originally in the hopper. When the resultant number approached zero, the elevating belt 370 would be actuated at the next group containing a void (as above described), thus adding that number of cigarettes to the running total.

The elevating belt 370 could, alternatively, be positioned downstream of the transfer drum 380. However it could then occur that one or more of the cigarettes of a group elevated into the hopper were already once before refed, i.e. if that group had previously contained one or more voids.

We claim:

1. Apparatus for packing batches of cigarettes in wrappers, said batches being of rectangular shape and having a pair of large faces, said apparatus comprising:
    (a) a wrapper conveyor arranged to travel along a first path and having a plurality of regularly spaced U-shaped compartments each having a base corresponding to said large faces of said batches, the longitudinal axis of said base being transverse to the direction of movement of said wrapper conveyor, and having a pair of side walls which lie transverse to the direction of movement of said wrapper conveyor;
    (b) wrapper feed means for feeding a wrapper in a U-shape into each of said compartments with opposite sides of said U-shaped wrapper extending along said side walls respectively;
    (c) a batch conveyor arranged to travel along a second path, a portion of said second path being adjacent a portion of said first path, and having a plurality of pockets spaced from each other by a distance corresponding to the distance between adjacent of said compartments on said wrapper conveyor, each pocket being adapted for carrying a batch of cigarettes and having a base corresponding to said large faces of said batches, the longitudinal axis of said base being transverse to the direction of movement of said batch conveyor, said batch conveyor being movable such that at least one pocket thereon may be maintained in alignment with a respective compartment on said wrapper conveyor along said portions of said respective first and second paths;

(d) transfer means operable to transfer a batch of said cigarettes from each pocket into a wrapper in a respective compartment while said pocket and respective compartment are aligned along said portions of said respective first and second paths;

(e) said wrapper and batch conveyors including means to locate the planes of said base of each compartment and said base of each respective pocket while said compartments and pockets are aligned along said portions of said respective first and second paths, at an obtuse angle at least at the commencement of operation of said transfer means transferring a cigarette batch therebetween such that the edge of the portion of a wrapper adjacent the base of each compartment will clear the edges of said cigarette batch; and (f) means associated with each compartment for folding the two sides of each wrapper over the respective batch during said transfer but after said transfer has commenced.

2. Apparatus as claimed in claim 1 wherein said wrapper and batch conveyors are adapted to locate the planes of said base of each compartment and said base of each respective pocket, while said compartments and pockets are aligned along said portions of said respective first and second paths, at an angle of about 175°.

3. Apparatus as claimed in claim 1, in which each pocket comprises means for laterally compressing a cigarette batch therein.

4. Apparatus as claimed in claim 1, further comprising at least two fixed cigarette hopper outlets disposed adjacent the batch conveyor, and in which the wrapper conveyor is movable at constant speed while the batch conveyor is movable through a cycle including: a stationary period when at least two neighbouring pockets thereof are filled with batches from said hopper outlets, a catching-up period when the batch conveyor moves at a higher speed than the wrapper conveyor, and a transfer period when the conveyors are moving at the same speed and with filled pockets opposite empty compartments so that at least two batches are transferrable from the batch conveyor to the wrapper conveyor.

5. Apparatus as claimed in claim 1, in which said wrapper feed means comprises a rotor having a plurality of arms each for receiving a wrapper and for placing the wrapper into a respective compartment, and a rotary folder for folding the leading portion of the wrapper against the arm to form a side limb of the U-shaped wrapper.

6. Apparatus as claimed in claim 5, in which each arm is resiliently supported from the rotor.

7. Apparatus as claimed in claim 1, in which the wrapper conveyor and the batch conveyor are both movable at constant speed, and further comprising a cigarette conveyor for conveying a continuous stream of cigarettes, and feed means for feeding batches from said stream into the pockets of the batch conveyor.

8. Apparatus as claimed in claim 7, in which said continuous stream is a single row of cigarettes, and further comprising inspection means for rejecting faulty cigarettes from said stream to form voids therein, supply means for supplying one cigarette at a time for filling a void, a transfer rotor located between the supply means and the cigarette conveyor for transferring a cigarette to a void, and drive means controlled in timed relation with a rejection of a cigarette at the inspection means for accelerating the rotor to the speed of the cigarette conveyor.

9. Apparatus as claimed in claim 8, further comprising a refeed conveyor for periodically feeding a group of cigarettes to said supply means, and control means operable to select and divert to said refeed conveyor a group containing a void which would otherwise be fed as an incomplete batch by said feed means into a pocket.

10. A method for packing batches of cigarettes in wrappers, said batches being of rectangular shape and having a pair of large faces, said method comprising:

(a) directing a wrapper conveyor having a plurality of regularly spaced U-shaped compartments along a first path, each U-shaped compartment having a base corresponding to said large faces of said batches and having a pair of side walls, said pair of side walls and the longitudinal axis of said base being transverse to the direction of movement of said wrapper conveyor;

(b) feeding a wrapper in a U-shape successively into each of said compartments with opposite sides of said U-shaped wrapper extending along said side walls respectively;

(c) directing a batch conveyor having a plurality of pockets along a second path, a portion of said second path being adjacent a portion of said first path, said pockets being spaced from each other by a distance corresponding to the distance between adjacent of said compartments on said wrapper conveyor, each pocket having a base corresponding to said large faces of said batches and the longitudinal axis of said base being transverse to the direction of movement of said batch conveyor, said batch conveyor being moved such that at least one pocket thereon may be maintained in alignment with a respective compartment on said wrapper conveyor along said portions of said respective first and second paths;

(d) transferring a batch of said cigarettes from each pocket into a wrapper in a respective compartment while locating the planes of said base of said compartment and said base of said respective pocket, when said compartment and pocket are aligned along said portions of said respective first and second paths, at an obtuse angle at least at the commencement of said transfer such that the edge of the portion of the wrapper adjacent the base of said compartment will clear the edges of said cigarette batch; and (e) folding the two sides of each wrapper over the respective batch during said transfer but after said transfer has commenced.

11. A method as claimed in claim 10 wherein the planes of said base of said compartment and said base of said respective pocket, when said compartment and pocket are aligned along said portions of said respective first and second paths, are located at an angle of about 175°.

12. A method as claimed in claim 10, further comprising the step of compressing the batch of cigarettes prior to transfer.

13. Apparatus for packing groups of cigarettes, each group as packed containing a predetermined number of cigarettes, said apparatus comprising a conveyor for conveying groups of cigarettes in succession along a path, each group comprising closely spaced cigarettes moving transversely to their axes along said path, inspection and rejection means for rejecting faulty cigarettes from said conveyor to form voids in the groups from which faulty cigarettes have been rejected, detection means for detecting said voids in said groups, supply means for supplying one cigarette at a time for filling a void, transfer means connected to and actuated by the detection means in timed response with a void in a group for transferring a cigarette from the supply means to the conveyor to fill the void in the group, said transfer means including a first rotor having a single cigarette support on its periphery for receiving a cigarette from the supply means and a stepper motor to accelerate the rotor up to the speed of the conveyor, a refeed conveyor for periodically feeding a group of cigarettes from said conveyor means to said supply means, sensing means for sensing when the cigarettes in said supply means fall below a predetermined level, and means connected to and actuated by the combination of said detection and sensing means to select and divert from said conveyor downstream of said rejection means to said refeed conveyor a group containing a void which would otherwise be packed as a group containing less than said predetermined number of cigarettes.

* * * * *